(12) United States Patent
Odarczenko et al.

(10) Patent No.: US 10,508,204 B2
(45) Date of Patent: Dec. 17, 2019

(54) SELF-HEALING COATING

(71) Applicant: The Board of Trustees of the University of Illinois, Urbana, IL (US)

(72) Inventors: Michael Thomas Odarczenko, Urbana, IL (US); Scott R. White, Champaign, IL (US); Nancy R. Sottos, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 341 days.

(21) Appl. No.: 15/365,663

(22) Filed: Nov. 30, 2016

(65) Prior Publication Data

US 2017/0158886 A1  Jun. 8, 2017

Related U.S. Application Data

(60) Provisional application No. 62/262,175, filed on Dec. 2, 2015.

(51) Int. Cl.
| | |
|---|---|
| *C08J 3/28* | (2006.01) |
| *C09D 5/08* | (2006.01) |
| *C09D 163/00* | (2006.01) |
| *B01J 19/12* | (2006.01) |
| *C08G 59/18* | (2006.01) |
| *C09D 7/40* | (2018.01) |

(52) U.S. Cl.
CPC .............. *C09D 5/08* (2013.01); *B01J 19/123* (2013.01); *C08G 59/188* (2013.01); *C09D 7/69* (2018.01); *C09D 163/00* (2013.01)

(58) Field of Classification Search
CPC .... B01J 19/123; C08G 59/188; C09D 163/00; C09D 5/08; C09D 7/69
See application file for complete search history.

(56) References Cited

U.S. PATENT DOCUMENTS

| | | | |
|---|---|---|---|
| 6,858,659 | B2 | 2/2005 | White et al. |
| 7,192,993 | B1 | 3/2007 | Sarangapani et al. |
| 7,566,747 | B2 | 7/2009 | Moore et al. |
| 7,569,625 | B2 | 8/2009 | Eller et al. |
| 7,723,405 | B2 | 5/2010 | Braun et al. |
| 8,383,697 | B2 | 2/2013 | Wilson et al. |
| 8,846,404 | B2 | 9/2014 | Odom et al. |
| 9,108,364 | B2 | 8/2015 | Caruso et al. |
| 9,249,237 | B2 | 2/2016 | Perichaud et al. |
| 9,415,575 | B2 | 8/2016 | Beiermann et al. |
| 2002/0198289 | A1* | 12/2002 | Gummeson .......... C09D 11/101 523/400 |
| 2008/0299391 | A1 | 12/2008 | White et al. |
| 2009/0005486 | A1* | 1/2009 | Raravikar .............. B82Y 30/00 524/413 |
| 2010/0144961 | A1 | 6/2010 | Delehanty et al. |
| 2011/0039980 | A1 | 2/2011 | Caruso et al. |
| 2011/0293958 | A1 | 12/2011 | Benkoski et al. |
| 2013/0017405 | A1 | 1/2013 | Benkoski et al. |
| 2014/0272364 | A1 | 9/2014 | Fitz et al. |
| 2014/0363091 | A1 | 12/2014 | Boday et al. |
| 2015/0079290 | A1* | 3/2015 | Yang ........................ B01J 13/18 427/331 |
| 2015/0328848 | A1 | 11/2015 | Patrick et al. |
| 2016/0346217 | A1 | 12/2016 | White et al. |
| 2017/0166709 | A1* | 6/2017 | Wilson ................... C09D 5/038 |

FOREIGN PATENT DOCUMENTS

WO    WO-2015171429 A1 * 11/2015 ............. B01J 13/14

OTHER PUBLICATIONS

Preparation and characterization of poly(urea-formaldehyde) microcapsules filled with epoxy resins by Li Yuan et al., Polymer, 47, 2006, pp. 5338-5349.*
Caruso, Mary M. et al., "Robust, Double-Walled Microcfapsules for Self-Healing Polymeric Materials," Applied Materials & Interfaces, vol. 2, No. 4, 1194-1199, 2010.
Cho, Soo Hyoun et al., "Self-Healing Polymer Coatings," Advanced Materials, 2009, 21, 645-649.
Jin, Henghua et al., "Thermally Stable Autonomic Healing in Epoxy Using a Dual-Microcapsule System," Advanced Materials, 2014, 26, 282-287.
Zhao, Dong et al., "Microencapsulation of UV-Curable Self-Healing Agent for Smart Anticorrosive Coating," Chinese Journal of Chemical Physics, vol. 27, No. 5, Oct. 27, 2014, 607-615.
Zheludkevich, Mikhail L. et al., "Anticorrosion Coatings With Self-Healing Effect Based on Nanocontainers Impregnated With the Corrosion Inhibitor," Chemical Materials, 2007, 19, 402-411.

* cited by examiner

*Primary Examiner* — Irina S Zemel
(74) *Attorney, Agent, or Firm* — Haukaas Fortius PLLC; Michael H. Haukaas

(57) ABSTRACT

Photo-protected microcapsules containing a photopolymer composition are dispersed in an epoxy coating to form an autonomic self-healing material. The capsule shell wall is formulated to protect the photopolymer composition from electromagnetic radiation exposure prior to rupture of the capsule shell, so that the photopolymer composition (e.g., a UV curable epoxy resin) remains active until triggered by damage to the capsule shell. Carbon black pigment is a suitable UV protector for the capsules. Upon sufficient damage to a region of the coating, the capsules will rupture and the photopolymer composition will fill and cure in and/or around the damaged region in the presence of electromagnetic radiation, achieving autonomic healing of the damaged coating.

20 Claims, 10 Drawing Sheets

SELF-HEALING COATING

RELATED APPLICATIONS

This application claims priority under 35 U.S.C. § 119(e) to U.S. Provisional Patent Application No. 62/262,175, filed Dec. 2, 2015, which is incorporated herein by reference.

FEDERALLY SPONSORED RESEARCH OR DEVELOPMENT

This invention was made with government support under FA9550-15-1-0087 awarded by the Air Force Office of Scientific Research (AFOSR). The government has certain rights in the invention.

BACKGROUND OF THE INVENTION

Polymeric coatings and composites are commonly used to protect a substrate from wear and environmental exposure. Common uses are seen in articles of manufacture in the military, aerospace and petroleum industries. These types of coatings and composites are particularly useful where high strength, stiffness, low weight and/or environmental stability are required. The integrity of a coating or composite can be compromised by many things, such as, fatigue, impact or scratch damage, which can expose the underlying substrate to a corrosive environment. Corrosion reduces the mechanical performance of substrates, which results in timely and expensive repairs. Zinc phosphate polymeric coatings are commonly used in industry to protect steel substrates, but they only slow down corrosive damage.

Numerous approaches have been studied to develop autonomic, self-healing coatings. These so-called smart coatings can protect a substrate from wear and environmental exposure. Examples of these approaches are described in U.S. Pat. Nos. 9,108,364, 7,723,405, 7,569,625, 7,566,747, 7,192,993 and 6,858,859, and U.S. Patent Publication Numbers 2014/0272364, 2014/0363091, 2013/0017405, 2011/0293958 and 2008/0299391. However, the smart coatings described in the field suffer from significant chemical and mechanical limitations, which make them less desirable to use in many situations. For example, nearly all the reported synthetic self-healing strategies require some form of intervention after mechanical damage has been inflicted to initiate the healing process and repair the damage. The current approaches can entail the expenditure of significant external energy, possess limited life-spans or are limited to modest temperatures for autonomic functionality. A large number of reported coatings employ specialty chemicals, which are often expensive, limited to narrow uses and provide less than ideal results in many situations.

Accordingly, there is a need for improved autonomic, self-healing coatings. In this patent, we describe a novel photo-curable self-healing coating system to protect a material. The system is autonomic, self-powered, stable and broadly adaptable to work on a variety of different substrates under different environmental conditions.

SUMMARY

We describe herein an autonomic self-healing material comprising microcapsules having a photo-protecting outer shell and a photopolymer composition encapsulated in the shell, where the self-healing process is autonomically initiated when a region of the material is sufficiently damaged to induce rupturing of one or more microcapsules, which release the photopolymer composition in and/or around the damaged region, and the released photopolymer composition is exposed to electromagnetic radiation.

Another embodiment of the invention is an autonomic self-healing material comprising one or more film-forming binders and a plurality of microcapsules, the microcapsules enclosing at least a photopolymer composition encapsulated within a volume defined by a photo-protecting outer shell, where the self-healing process is autonomically initiated when a region of the material is sufficiently damaged to induce rupturing of one or more microcapsules, which release the photopolymer composition in and/or around the damaged region, and the released photopolymer composition is exposed to electromagnetic radiation.

Another aspect of the invention is a method of autonomically self-healing a material after it has been damaged and exposed to electromagnetic radiation comprising formulating a plurality of microcapsules into the material, wherein the microcapsules comprise a photopolymer composition enclosed within a photo-protecting outer shell, and where the self-healing process is autonomically initiated when a region of the material is sufficiently damaged to induce rupturing of one or more of the microcapsules, which release the photopolymer composition in and/or around the damaged region, and the released photopolymer composition is exposed to electromagnetic radiation.

In embodiments of the invention, the photo-protecting outer shell comprises photo-protecting solid particles, such as carbon black particles. In certain embodiments of the invention, the photopolymer composition comprises a photo-curable epoxy resin.

The self-healing material and method can autonomically protect a substrate from failing after it has been damaged and exposed to electromagnetic radiation, such as UV radiation (e.g., sunlight).

BRIEF DESCRIPTION OF THE DRAWINGS

The following drawings form part of the specification and are included to further demonstrate certain embodiments or various aspects of the invention. In some instances, embodiments of the invention can be best understood by referring to the accompanying drawings in combination with the detailed description presented herein. The description and accompanying drawings may highlight a certain specific example, or a certain aspect of the invention. However, one skilled in the art will understand that portions of the example or aspect may be used in combination with other examples or aspects of the invention.

DETAILED DESCRIPTION

Figure 1:
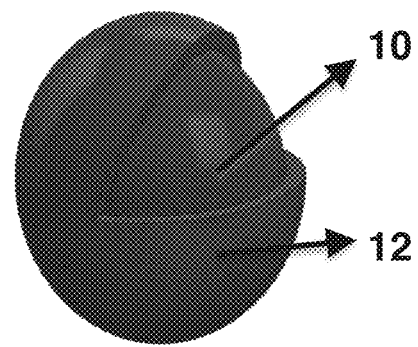
FIG. 1 shows a microcapsule with a cutout to view the core inside of the outer shell.

In one aspect of the invention, a microcapsule-based approach is taken, in which photo-protected capsules containing a photopolymer composition are embedded (or dispersed) in an epoxy coating to form an autonomic self-healing material. The capsule shell wall is formulated to protect the photopolymer composition from electromagnetic exposure prior to rupture of the microcapsule, so that the photopolymer composition (e.g., a photo-curable monomer composition) remains active and protected until triggered by the impact of sufficient mechanical or other types of damage to a region of the coating to induce rupturing of one or more of the microcapsules, which release the photopolymer composition in and/or around the damaged region. When sufficient damage is inflicted on the coating, one or more capsules will rupture, which allow the photopolymer composition to fill in and/or around the damaged region. When the damaged region is filled with the photopolymer composition and exposed to electromagnetic light (e.g., of a similar intensity to sunlight), the photopolymer composition will cure in and/or around the damaged region and autonomic self-healing of the damaged coating can be achieved.

The curing of the microcapsule core composition heals the damaged coating and protects it from corrosion. The coating can be applied to numerous types of substrates (e.g., clean and prepared steel substrates). Ultrasonic analysis can be used to measure coating thickness and uniformity. Corrosion inhibition efficiencies (IE) can be evaluated by exposing the healed coatings to a salt solution (e.g., 5 wt % NaCl solution) and employing visual inspection and electrochemical linear polarization to quantify corrosion. IEs can range up to 100%. In the examples shown below, IEs ranged from about 15-75%.

We describe herein improved self-healing materials and methods that can minimize or prevent undercutting of steel and other types of substrates, and extend the life of corrosion protection. The self-healing materials are photo-protected from electromagnetic radiation. This means the photo-protected materials can be employed in a wide variety of applications, such as in articles of manufacture used in environments that are routinely exposed to sunlight (e.g., UV radiation), and unintended premature curing of the self-healing agents will not occur. Moreover, exposing a damaged region of the material to electromagnetic radiation will initiate the self-healing process. This means that no human intervention is required for UV curable healing agents that are exposed to sunlight.

The material can be used in all kinds of coatings—primers, mid-coats, and top-coats. The material can include other functional agents or be combined with other functionalized coatings, such as agents and coatings to improve or provide various different properties of the coating (e.g., hydrophobicity, ice repellence, anti-fouling, anti-dusting, anti-corrosion, indicators of damage, thermo-protection, other types of self-healing agents, etc.). The capsules may include other ingredients in addition to the photo-polymer composition. For example, the capsules may contain one or more solvents, stabilizers, antioxidants, flame retardants, plasticizers, colorants, dyes, fragrances or adhesion promoters. Examples of capsules that include a solvent are disclosed, for example, in U.S. patent application Ser. No. 12/739,537.

The capsules may include an aprotic solvent, a protic solvent or a mixture thereof. Examples of aprotic solvents include hydrocarbons, such as cyclohexane; aromatic hydrocarbons, such as toluene and xylenes; halogenated hydrocarbons, such as dichloromethane; halogenated aromatic hydrocarbons, such as chlorobenzene and dichlorobenzene; substituted aromatic solvents, such as nitrobenzene; ethers, such as tetrahydrofuran (THF) and dioxane; ketones, such as acetone and methyl ethyl ketone; esters, such as ethyl acetate, hexyl acetate, ethyl phenylacetate (EPA) and phenylacetate (PA); tertiary amides, such as dimethyl acetamide (DMA), dimethyl formamide (DMF) and N-methyl pyrrolidine (NMP); nitriles, such as acetonitrile; and sulfoxides, such as dimethyl sulfoxide (DMSO). Examples of protic solvents include water; alcohols, such as ethanol, isopropanol, butanol, cyclohexanol and glycols; and primary and secondary amides, such as acetamide and formamide.

In certain embodiments, the photopolymer composition is based on a photo-curable epoxy resin. The coatings have uniform thickness, are easy to source and manufacture, and allow for wide applications in industry. Similarly, the microcapsules sizes are relatively small when compared to the thickness of the coating. In certain embodiments, the size can be as small as 20 microns. The size variability allows for wider applications. In some embodiments, the photo-curable epoxy resin composition comprises bisphenol A epoxy resin, bisphenol F epoxy resin, novolac epoxy resin, aliphatic epoxy resin, cycloaliphatic epoxy resin and/or glycidylamine epoxy resin. In certain embodiments, the photo-curable core composition comprises diglycidyl ether of bisphenol A (DGEBA) or diglycidyl ether of bisphenol F (DGEBF). In a particular embodiment, the photo-curable epoxy resin composition comprises an epoxy resin diluted with a low viscosity reactive diluent. In some embodiments, the low viscosity reactive diluent comprises ethyl hexyl glycidyl ether, trimethylol propane triglycidyl ether, phenyl glycidyl ether or cyclohexane dimethanol diglycidyl ether. In one embodiment, the low viscosity reactive diluent comprises o-cresyl glycidyl ether (o-CGE). In a particular embodiment, the bisphenol-A epoxy resin composition comprises EPON 813™ (HEXION).

EPON 813™ (Hexion)

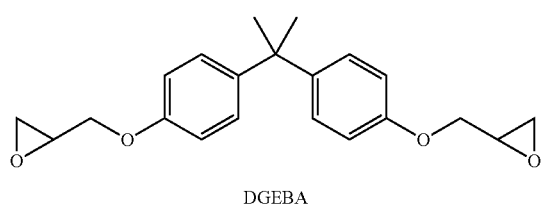

DGEBA

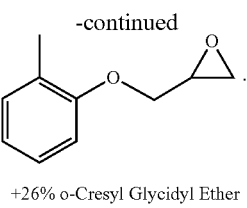

+26% o-Cresyl Glycidyl Ether

Homo-Polymerized DGEBA

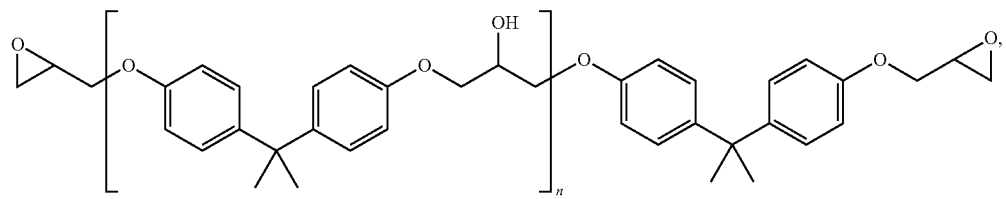

where n denotes the number of polymerized subunits and can number in the tens of thousands or more. In some embodiments, n is in the range from about 0 to about 25. In certain embodiments, the microcapsules comprise up to about 100 wt. % of epoxy resin in the composition cores.

As with other classes of thermoset polymer materials, the photopolymer (e.g., epoxy resin) compositions can be formulated by blending different grades of polymer resin and/or adding additives, inhibitors, stabilizers, plasticizers and/or fillers to achieve desired processing and/or final properties, or to reduce cost. Curing can be achieved by reacting a polymer with itself (homo-polymerization) or by forming a co-polymer with polyfunctional curatives or hardeners (e.g., catalysts, promoters or initiators). In principle, any molecule containing a reactive hydrogen may react with the epoxide groups of an epoxy resin. Common classes of hardeners for epoxy resins include amines, acids, acid anhydrides, phenols, alcohols and thiols. Relative reactivity (lowest first) is approximately in the order: phenol<anhydride<aromatic amine<cycloaliphatic amine<aliphatic amine<thiol. The epoxy curing reaction may be accelerated by addition of small quantities of accelerators. Tertiary amines, carboxylic acids and alcohols (especially phenols) are effective accelerators. Bisphenol A is a highly effective and widely used accelerator.

In some embodiments, the photopolymer composition comprises a catalyst, such as a polymerization catalyst. In certain embodiments, the polymerization catalyst comprises a cationic photoinitiator. In particular embodiments, the polymerization catalyst comprises IRGACURE® 250 (Iodonium, (4-methylphenyl)[4-(2-methylpropyl)phenyl]-, hexafluorophosphate) (BASF), THP (triarylsulfonium hexafluorophosphate salts) (SIGMA-ALDRICH), THA (triarylsulfonium hexafluoroantimonate salts) (SIGMA-ALDRICH), or DARACUR® 1173 (2-hydroxy-2-methyl-1-phenylpropan-1-one (CIBA). All of these catalysts are activated by exposure to UV radiation.

THP

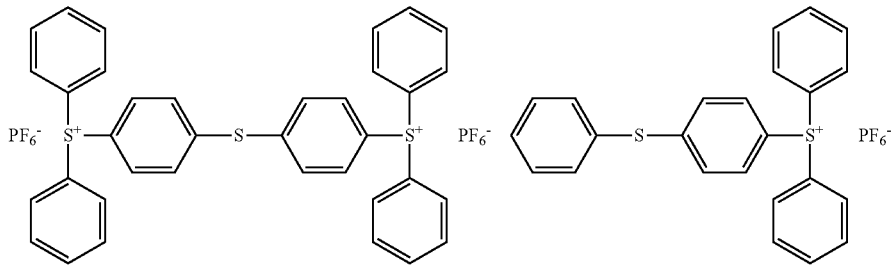

Triarylsulfonium Hexafluorophosphate

A skilled artisan in the field can routinely determine whether it is advantageous to add a photo-polymerization catalyst, and if so, can also determine the type and amount of the catalyst that will provide the desired results. In some embodiments, the composition encapsulated within the microcapsules comprise up to about 75 wt % of catalyst. In certain embodiments, the catalyst comprises about 0.1-50 wt %, 0.1-25 wt %, 0.1-10 wt % or 0.1-5 wt %, based on the total weight percent of the composition encapsulated within the microcapsules. In some embodiments, the microcapsules comprise about 1-5 wt % or 2-5% of a photo-polymerization catalyst. In embodiments that include a photo-polymerization catalyst, the polymer portion of the composition usually amounts to about 95-98 wt % or 95-99 wt %, based on the total weight percent of the composition encapsulated within the microcapsules. In one particular embodiment, the photopolymer composition comprises a photo-curable epoxy resin (e.g., EPON 813™ resin) and a photo-polymerization catalyst. The wt % numbers are relative to the total weight of a microcapsule prior to being formulated into the film.

In one embodiment, the photo-protecting outer shell wall absorbs and/or reflects electromagnetic radiation to prevent unintended polymerization of the photopolymer composition encapsulated therein. This embodiment provides a long and stable life of the material. The curing of the photopolymer composition will not occur until the substrate is sufficiently damaged so as to break open the outer shell wall of the microcapsules and release the photopolymer composition contained therein, which is then exposed to electromagnetic radiation. The outer shell wall provides protection (e.g., thermal and low impact stability) from unintended rupturing. Accordingly, the outer shell can be a single wall or a multi-wall (e.g., double wall).

In certain embodiments, the photo-protecting outer shell comprises a solid particle photo-protecting absorber or reflector, such as solid particles of carbon black, nano clay, zinc, zinc oxide, titanium dioxide, or a combination thereof. In particular embodiments, the photo-protecting solid particles comprise a pigment, such as carbon black. For example VULCAN® XC72R (CABOT) is a suitable carbon black pigment having a particle size of about 48+/−13 nm. In some embodiments, the photo-protecting outer shell comprises UF and a plurality of photo-protecting solid particle absorbers or reflectors. A skilled artisan in the field can determine how much of a solid particle photo-protecting absorber or reflector is needed to provide desired results. In some embodiments, the photo-protecting outer shell comprises about 20-80 wt % of solid particle photo-protecting absorber or reflector. In certain particular embodiments, the photo-protecting outer shell comprises about 0.2-10%, 0.5-8%, 1-7.5%, 2-6% or 2.5-5% of carbon black pigment. The wt % numbers are relative to the total weight of a microcapsule prior to being formulated into the film.

The microcapsules can be mixed into a variety of polymer film types, such as an epoxy resin film (or coating). In embodiments, the wt % amount of microcapsules with respect to the total weight of the film or coating is about 0.5-5%, about 5-10%, about 10-15%, about 15-20%, 20-25%, about 25-30%, about 30-35%, about 35-40%, about 40-45% or about 45-50%. Amounts greater than a wt % of 50% can also be formulated for use in certain applications. In a particular embodiment, about 10 wt % of microcapsules (with respect to the total weight of the coating) can be added to the epoxy resin film or coating.

In some embodiments, the epoxy resin film comprises a zinc-pigmented epoxy, water-based epoxy or DGEBA-based resin. In a particular embodiment, the epoxy resin film comprises EPI-REZ™ 6520-WH-53 resin (HEXION) and EPIKURE™ 6870-W-53 (HEXION) curing agent. Depending on the intended application, various combinations of polymer film types may be utilized.

The substrate can be any material designed to carry a load, such as a structural or non-structural (e.g., elastomer) substrate. A structural substrate is one that carries the load with minimal deflection. Structural substrates include metal, non-metal, ceramic and polymeric materials. In certain embodiments, the structural substrate comprises a polymeric structural composite (PMC). PMCs are composed of high strength/stiffness fibers, held together by a polymer matrix material. Common examples include a carbon fiber composite, glass fiber, an epoxy resin, or a combination thereof. In one embodiment, the PMC comprises a combination of an epoxy resin with glass and/or carbon fibers. The epoxy resin can be vacuum infused into the glass fiber and/or the carbon fiber to create a glass and/or carbon fiber reinforced epoxy composite. In other embodiments, the structural substrate is steel.

While we have exemplified epoxy coatings and epoxy microcapsules below, it can be understood that other photopolymers and mixtures of epoxies and other photopolymers can also be employed in various embodiments. These phototopolymers include a diverse mixture of monomers, oligomers and/or photoinitiators that conform into a hardened polymeric material through curing. Typically, a photopolymer consists of a mixture of multifunctional monomers and oligomers in order to achieve the desired physical properties, and a wide variety of monomers and oligomers have been developed that can polymerize in the presence of light either through internal or external initiation. Monomers or functional group, employed in cationic photopolymerization include styrenic compounds, vinyl ethers, N-vinyl carbazoles, lactones, lactams, cyclic ethers, cyclic acetals and cyclic siloxanes. The properties of a photocured material, such as, flexibility, adhesion and chemical resistance are provided by functionalized oligomers present in the photocurable composite. Oligomers are typically epoxides, urethanes, polyethers or polyesters, each of which provide specific properties to the resulting material. Each of these oligomers are typically functionalized by an acrylate (e.g., an epoxy oligomer that has been functionalized by acrylic acid). Polymers used in industrial coatings and composites, including epoxy, polyurethane, urethane, fluoropolymer, polyvinyl chloride, polyimide, polyamide, acrylic, alkyd, silicone, phenolic resin, nitrocellulose, nylon, (natural and synthetic) rubber, and combinations thereof, can also be used in various embodiments of the invention.

So far, we have disclosed a microcapsule system for delivering a self-healing agent. There are other ways to deliver a self-healing agent. For instance, another embodiment of the invention utilizes a (micro)vascular network delivery system containing a self-healing agent as disclosed herein. In general, a polymer coating or composite can be fabricated with a (micro)vascular network (e.g., polymer matrix having hollow channels to hold components). A channel of the vascular network contains a photopolymer composition as described herein. In this embodiment, the material of the channel wall itself can provide protection from electromagnetic radiation. If some embodiments, the material of the channel wall comprises a photo-protecting agent as described herein. The vascular network can include one or more channels, interconnected or not, which provides optionality for adding other functional agents for intended applications. When (e.g., mechanical) damage is inflicted on an area of the system, the channels in the damaged area are breached and locally release the component(s) contained therein (e.g., photopolymer composition) in and/or around the damaged area. Self-healing begins upon the exposure of the damaged area to electromagnetic radiation.

In other embodiments of the vascular delivery system, additional channels are added to the (micro)vascular network to hold additional functional agents, such as other types of self-healing agents, visual reporting agents, etc. In still another embodiment of the invention, a combination of the (micro)vascular network and microcapsule systems described herein provide multiple options to autonomically repair damage and impart other functionality to a material. The disclosure herein regarding a self-healing microcapsule system can be applied to a self-healing microvascular system.

The self-healing microcapsule concept is illustrated in the microcapsule shown in FIG. 1. Part of the capsule wall (outer shell) is cut away to show a self-healing agent(s) 10 contained therein. The capsule wall 12 comprises a UV photo-protecting agent, which protects the self-healing agent encapsulated therein from a matrix to which it is applied and from UV exposure prior to being ruptured. The capsule is ruptured when it has been damaged (e.g., by fatigue, impact or scratching). The self-healing agent is only released (and de-protected) upon rupture of the capsule.

Figure 2:
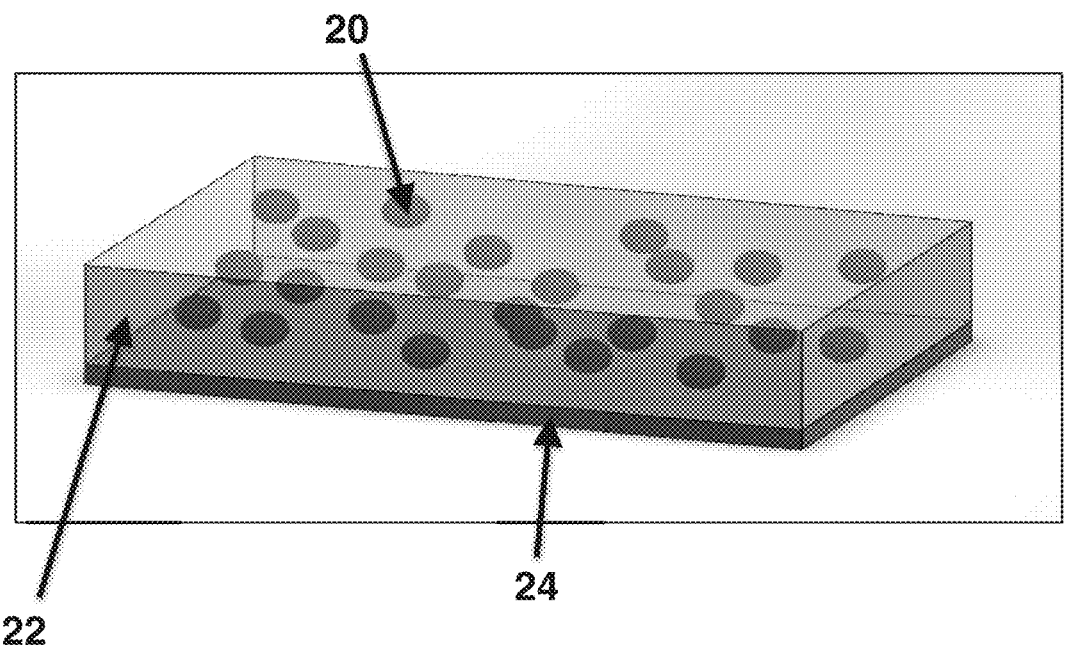
FIG. 2 shows an epoxy coating containing self-healing microcapsules on top of a steel substrate.
Figure 3:
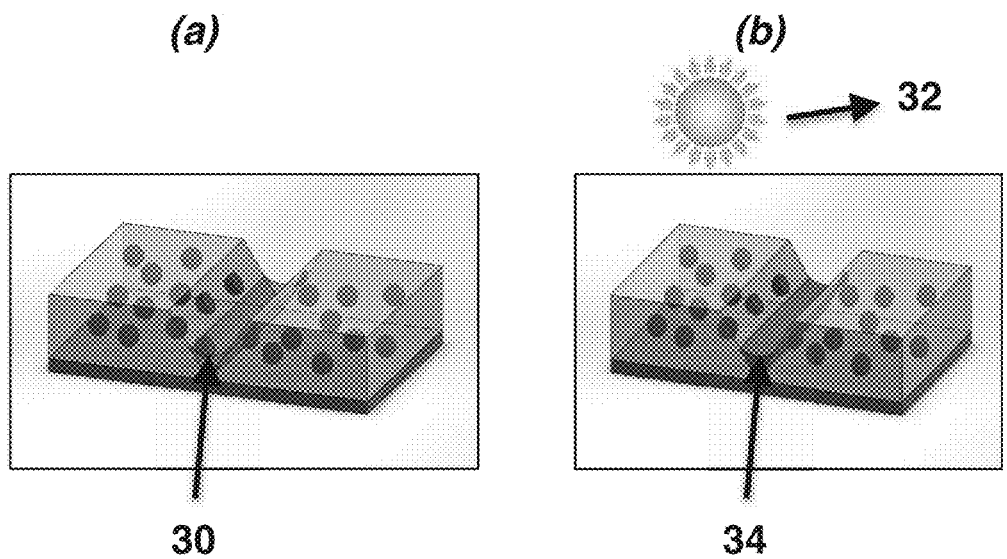
FIG. 3 shows epoxy coatings containing un-cured and cured microcapsule cores that have been exposed to UV radiation.

FIG. 2 shows self-healing microcapsules 20 formulated into an epoxy coating 22 and applied onto a steel substrate 24. When sufficient damage is inflicted on a region of the coating, at least one microcapsule will rupture and release the self-healing agent (e.g., photopolymer composition) in and/or around the damaged region. As shown in (a) of FIG. 3, prior to exposure to electromagnetic radiation, the self-healing agent is un-cured 30, and as shown in (b) of FIG. 3, once the self-healing agent is exposed to electromagnetic radiation (e.g., sunlight) 32, the self-healing agent will cure 34 and repair the coating.

Definitions

The following definitions are included to provide a clear and consistent understanding of the specification and claims. As used herein, the recited terms have the following meanings. All other terms and phrases used in this specification have their ordinary meanings as one of skill in the art would understand. Such ordinary meanings may be obtained by reference to technical dictionaries.

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such aspect, feature, structure, or characteristic with other embodiments, whether or not explicitly described.

The singular forms "a," "an," and "the" include plural reference unless the context clearly dictates otherwise.

The claims may be drafted to exclude any optional element. This statement is intended to serve as antecedent basis for the use of exclusive terminology, such as "solely," "only," and the like, in connection with any element described herein, and/or the recitation of claim elements or use of "negative" limitations.

The term "and/or" means any one of the items, any combination of the items, or all of the items with which this term is associated. The phrases "at least one" and "one or more" are readily understood by one of skill in the art, particularly when read in context of its usage.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values (e.g., numbers recited in weight percentages and material sizes) proximate to the recited range that are equivalent in terms of the functionality of the individual ingredient, material, composition, or embodiment. The term about can also modify the end-points of a recited range as discussed above in this paragraph.

As will be understood by the skilled artisan, all numbers, including those expressing sizes of materials, quantities of ingredients, and properties, such as molecular weight, reaction conditions, and so forth, are approximations and are understood as being optionally modified in all instances by the term "about." These values can vary depending upon the desired properties sought to be obtained by those skilled in the art utilizing the teachings of the descriptions herein. It is also understood that such values inherently contain variability necessarily resulting from the standard deviations found in their respective testing measurements.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc. As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio. Accordingly, specific values recited herein are for illustration only and do not exclude other defined values or other values within defined ranges.

One skilled in the art will also readily recognize that where members are grouped together in a common manner, such as in a Markush group, the invention encompasses not only the entire group listed as a whole, but each member of the group individually and all possible subgroups of the main group. Additionally, for all purposes, the invention encompasses not only the main group, but also the main group absent one or more of the group members. The invention therefore envisages the explicit exclusion of any one or more of members of a recited group. Accordingly, provisos may apply to any of the disclosed categories or embodiments whereby any one or more of the recited elements, species, or embodiments, may be excluded from such categories or embodiments, for example, for use in an explicit negative limitation.

The term "polymer" means a large molecule, or macromolecule, composed of many repeated subunits, from which originates a characteristic of high relative molecular mass and attendant properties.

The term "prepolymer" means a precursor containing intermediates or motifs that can undergo further reaction to form a polymer.

The term "capsule" means a closed object having a capsule wall enclosing an interior volume that may contain a solid, liquid, gas or a combination thereof, and having an aspect ratio of about 1:1 to about 1:10. The aspect ratio of an object is the ratio of the shortest axis to the longest axis, where the axes need not be perpendicular. A capsule may have any shape that falls within this aspect ratio, such as a sphere, a toroid or an irregular amoeboid shape. The surface of a capsule may have any texture, for example, rough or smooth.

Capsules may be made by a variety of techniques and from a variety of materials. Examples of materials from which the capsule shell materials may be made, and the techniques for making capsules include: poly(urea-formaldehyde), polyurethane, and polyurea formed by interfacial polymerization; polystyrene, polydimethylsiloxane, and poly(phthalaldehyde) formed by solvent evaporation; and all of these capsules prepared by a microfluidic approach.

The term "autonomic self-healing material" refers to automatically (without human or electronic control intervention) stopping, starting and adapting operation of the self-healing material depending on environmental or physical stimuli. The objective of the self-healing material is to return undamaged functionality to the environmentally or physically damaged material without humans needing to know the damage ever occurred. For example, when environmental or physical stimuli damage the material so as to rupture the described microcapsules contained therein, the capsule core composition releases in and/or around the area that is damaged, and autonomic self-healing can be achieved upon UV irradiation to the released capsule core composition.

An "effective amount" refers to an amount effective to bring about a recited effect, such as an amount necessary to form products in a reaction mixture. Determination of an effective amount is typically within the capacity of persons skilled in the art, especially in light of the detailed disclosure provided herein. The term "effective amount" is intended to include an amount of a compound or reagent described herein, or an amount of a combination of compounds or reagents described herein, e.g., that is effective to form products in a reaction mixture. Thus, an "effective amount" generally means an amount that provides the desired effect.

A "sufficient" amount refers to an amount sufficient to bring about a recited effect, such as an amount of damage inflicted to a coating that is necessary to rupture one or more microcapsules, thereby releasing the agents contained therein. Thus, a "sufficient" amount means an amount that provides the desired effect.

The design and operation of an autonomic self-healing material was demonstrated in the following Examples. The material was capable of self-healing when a sufficient amount of damage was inflicted to it so as to break open microcapsules inserted therein in the presence of UV radiation. The following Examples are intended to illustrate the above invention and should not be construed as to narrow its scope. One skilled in the art will readily recognize that the Examples suggest many other ways in which the invention could be practiced. It should be understood that numerous variations and modifications can be made while remaining within the scope of the invention.

EXAMPLES

Example 1. Microcapsule Fabrication

Figure 4:
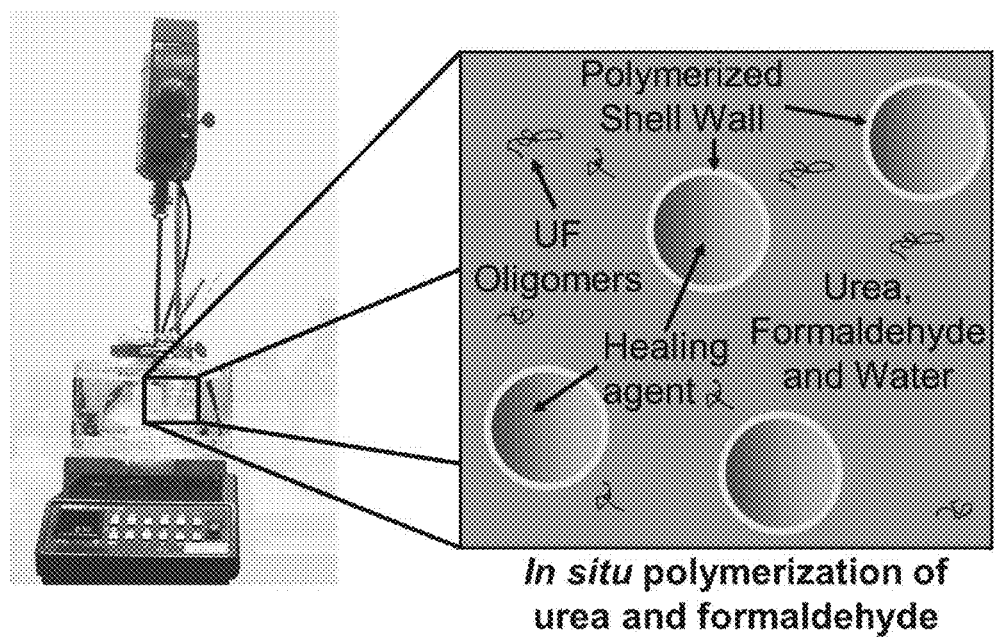
FIG. 4 shows microcapsules being prepared in a mixer via in situ polymerization of urea and formaldehyde in an oil-in-water emulsion.

The microcapsules were prepared by adapting conventional procedures. For example, see the procedures described in Caruso, M. M.; Blaiszik, B. J.; Jin, H. H.; Schelkopf, S. R.; Stradley, D. S.; Sottos, N. R.; White, S. R.; and Moore, J. S., *Robust, Double-Walled Microcapsules for Self-Healing Polymeric Materials, ACS Appl. Mater. Interfaces*, Vol. 2 (4), pp 1195-1199 (2010). In one embodiment, the capsules were prepared in a mixer via in situ interfacial polymerization of urea and formaldehyde (UF) in an oil-in-water emulsion, which is shown in FIG. 4. A monomer mixture of urea and aqueous formaldehyde was added to a mixer and stirred. The pH of the monomer mixture was adjusted to about 3.5 by adding a base, such as NaOH. The mixture was heated to about 55° C. at a rate of about 60° C./hour in a temperature controlled water bath. Continuing to stir the emulsion, 1-octanol was added to minimize surface bubbling. Under agitation, a UV curable resin composition comprising an epoxy resin (e.g., EPON™ 813, HEXION), a UV catalyst (e.g., IRGACURE® 250, BASF), and a UV protecting pigment (e.g., VULCAN® XC72R, CABOT) were added to the system to form microcapsules in an oil-in-water emulsion. After stirring for about 1-3 hours, the emulsion was cooled to room temperature and the products were collected by vacuum filtration, then washed and dried. The UV self-healing agents were encapsulated in microcapsules having a UF/carbon black shell wall. The average diameter of the capsules was 28+/−13 μm. The average shell wall thickness of the capsules was 105+/−31 nm.

Figure 5:
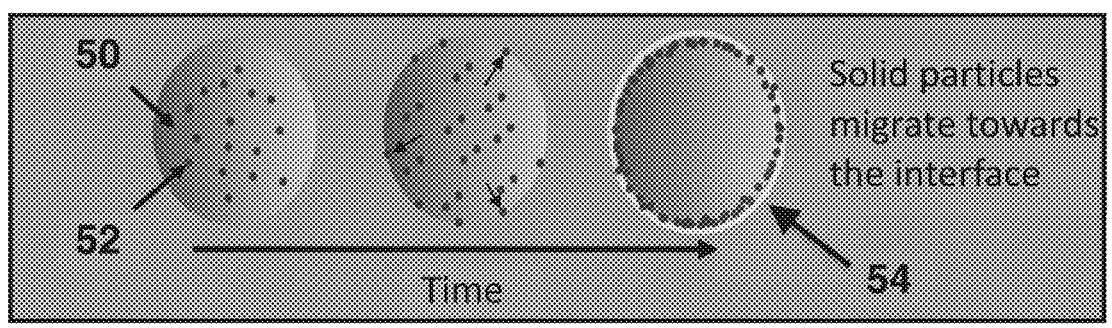
FIG. 5 shows a Pickering emulsion of a microcapsule during the encapsulation process.

FIG. 5 shows a Pickering emulsion of a microcapsule. When in situ interfacial polymerization of UF in an oil-in-water emulsion began, the microcapsule comprised an emulsion droplet 50 having a random mixture of UV protecting solid particles 52. Over time, the solid particles began to migrate toward the interface of the capsule wall. After an appropriate amount of time (e.g., 4 h), the solid particles were predominantly located in the capsule shell wall 54. The UF oligomers deposited on the interface to form the polymerized shell wall (UF) at the same time that the solid particles moved to the interface for each droplet. The UF oligomers moved from the surrounding water to the interface and polymerized, essentially "trapping" the carbon black particles at the interface with the shell wall.

Example 2. Microcapsule Characterization

Figure 6:
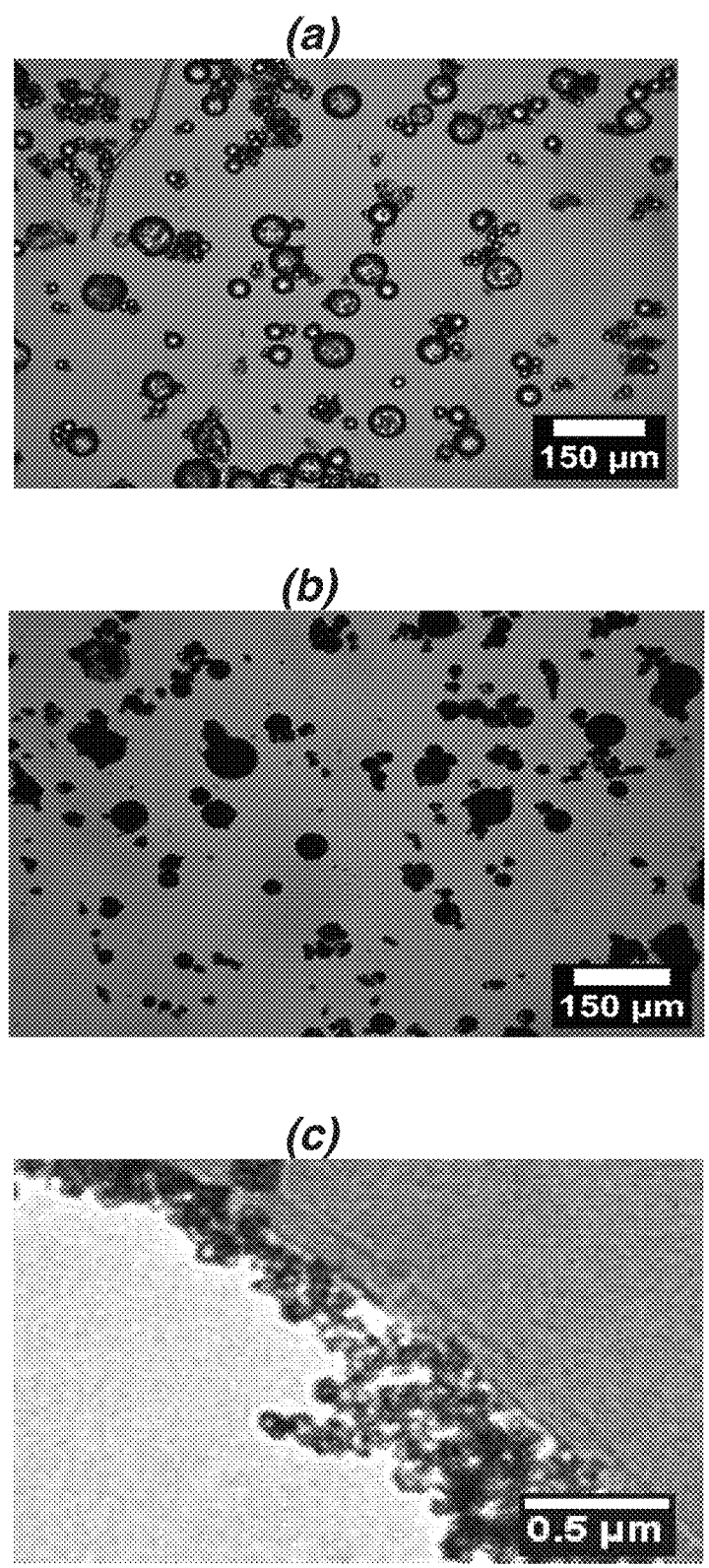
FIG. 6 shows images of microcapsules with and without the addition of carbon black pigment.

FIG. 6 shows images of microcapsules with and without the addition of carbon black pigment. In (a) of the figure, an optical image is shown of capsules containing in their core, EPON™ 813 and a UV curable catalyst. The capsule shell wall was made by the urea formaldehyde interfacial polymerization method described above, except no carbon black pigment was added. In (b) of the figure, the corresponding optical image is shown of capsules having the same core and shell wall materials, but carbon black was included in the encapsulation procedure. In (c) of the figure, a cross-sectional transmission electron microscopy (TEM) image is shown of a microcapsule manufactured with carbon black. The embedded epoxy is shown in darker shading and the shell wall is shown in lighter shading. The carbon black particles are lining the inside of the shell wall. This experiment verifies the Pickering emulsion scheme described in FIG. 5.

Figure 7:
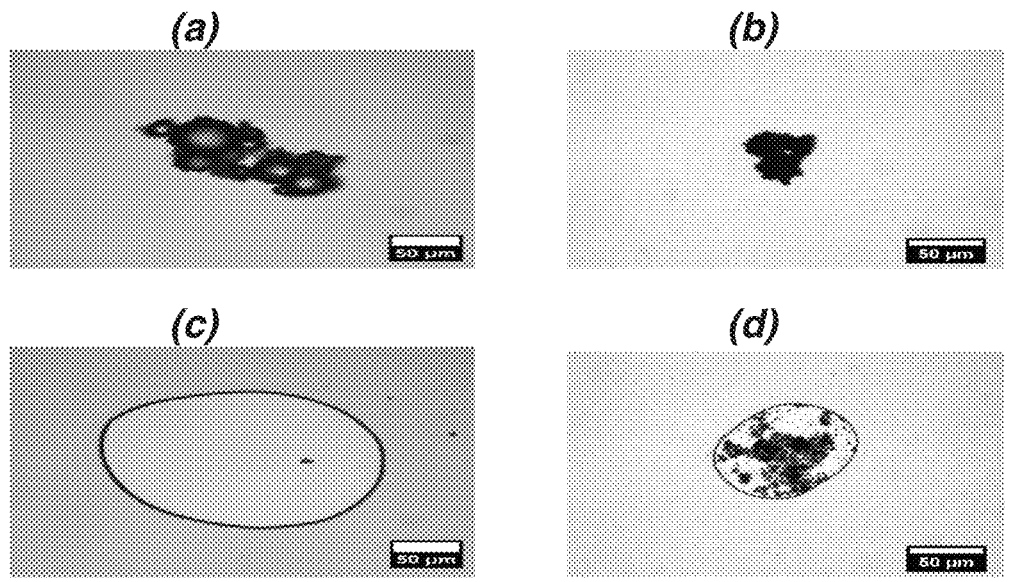
FIG. 7 shows optical images of microcapsules with and without the addition of carbon black pigment before and after being ruptured between two glass slides

FIG. 7 shows optical images of microcapsules with and without the addition of carbon black before and after being ruptured between two glass slides. In the case without carbon black (a and c of the figure), the released liquid is clear. In the case with carbon black (b and d of the figure), the released liquid is again mostly clear. This indicates that the carbon black chiefly resides in the capsule shell wall.

Figure 8:
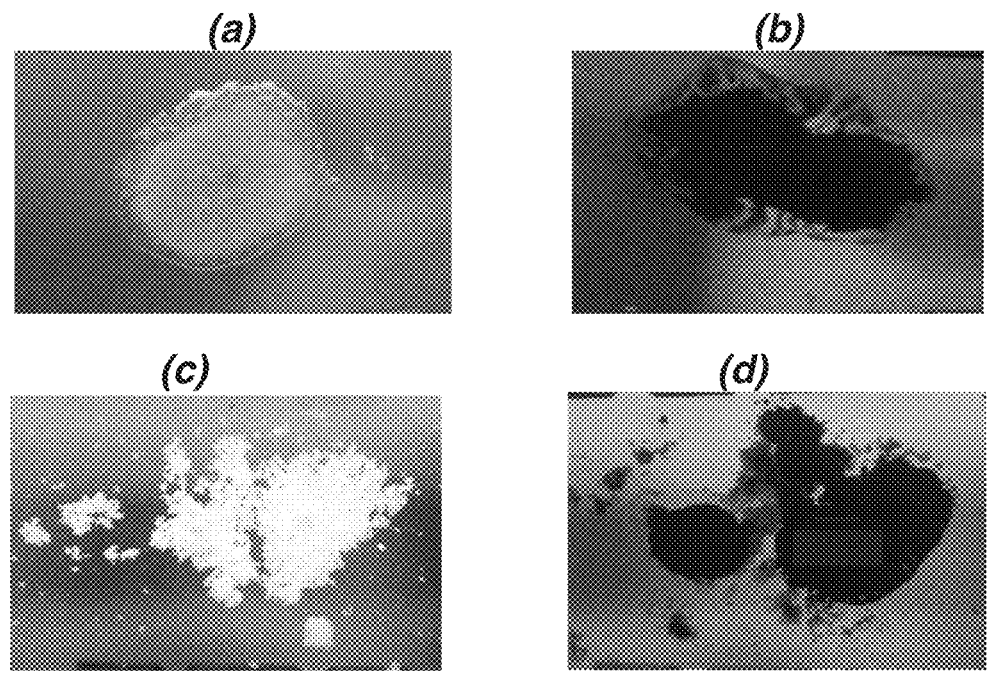
FIG. 8 shows optical images of ruptured microcapsules with and without the addition of carbon black pigment before and after being exposed to UV radiation.

FIG. 8 shows optical images of the ruptured microcapsules with and without the addition of carbon black pigment before and after being exposed to UV radiation. The images of capsules without carbon black are shown in (a) and (c) of the figure, and those with carbon black are shown in (b) and (d) of the figure. A similar amount of each capsule was placed in between two glass slides. The slides were pressed together to crush the capsules. Images (a) and (b) of the figure were taken before any UV exposure to the capsules. Before UV exposure, both types of capsules were crushed between the glass slides. Images (c) and (d) of the figure were taken after the undamaged capsules were exposed to UV light for two hours. After UV exposure, the capsules without carbon black (c of the figure) did not crush between the glass slides, whereas the capsules with carbon black (d of the figure) were crushed between the glass slides after the UV exposure. The capsules with carbon black were equally crushable between the glass slides before and after UV exposure showing that the resin composition encapsulated in those capsules did not cure when exposed to UV radiation. In contrast, the capsules without carbon black could only be crushed between the glass slides before UV exposure showing that the resin composition encapsulated in those capsules had cured when exposed to UV radiation. The experiment shows that carbon black pigment protects the resin composition in the capsules from curing in the presence of UV light.

Example 3. Microcapsule UV Protection (i) Thermogravimetry (TG)

Figure 9:
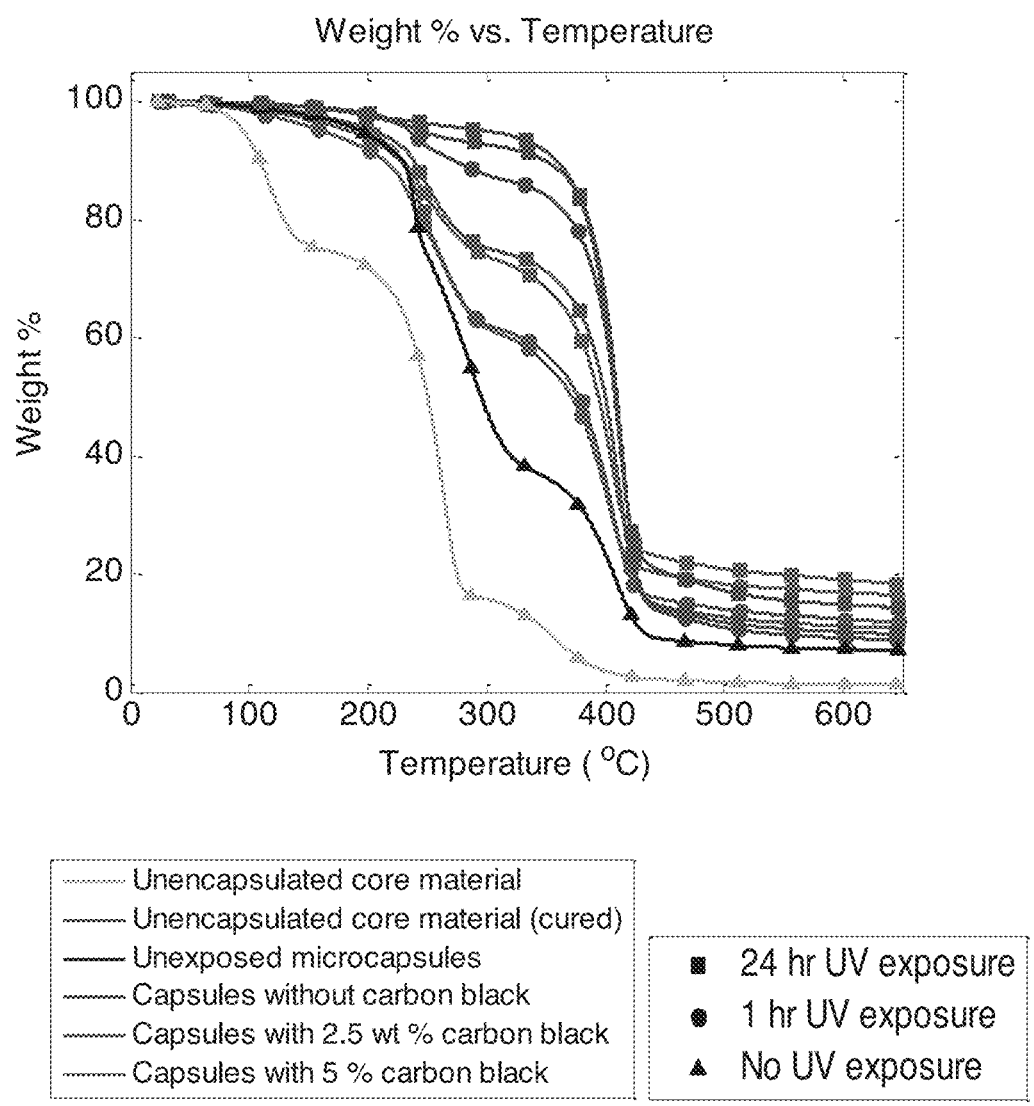
FIG. 9 shows a thermogravimetric analysis graph of weight % vs. temperature for un-cured and cured microcapsule cores that have been exposed to UV radiation.

The UV protection afforded by carbon black to the capsules was confirmed by dynamic thermogravimetric analysis (TGA). A thermogravimetric graph measuring weight % vs. temperature is shown in FIG. 9. Unencapsulated core material was tested against fully formed microcapsules encapsulated with core material. The core material comprised about 98 wt % of EPON™ 813 (HEXION) with about 2.0 wt % of UV photoinitiator THP. The effect of carbon black pigment was tested at three quantities—0 wt. %, 2.5 wt %, and 5.0 wt %—with respect to the total weight of the capsule core material. The effect of UV exposure (365 nm, 3800 μW/cm$^2$) was tested at three levels—no exposure, 1 h exposure, and 24 h exposure. Increasing amounts of carbon black added in to the encapsulation procedure increased the protection of the microcapsule core material from UV light, thus providing a lower residual mass in the 300 to 400° C. temperature range. Cured capsule core material had a high residual mass in the 300 to 400° C. temperature range, and the uncured core material had a low residual mass in the same temperature range. Similarly, increasing the UV exposure time from 0 to 24 hours, the residual mass increased for the unencapsulated core material. Therefore, the lower residual mass indicates that there is more liquid epoxy resin within the capsule core material.

(ii) Calorimetry

Photo-Differential Scanning calorimetry (p-DSC) was used to measure the degree of protection (DoP) of the microcapsules manufactured with carbon black. The samples were exposed to 365 nm UV light at an intensity of 3 mW/cm$^2$ for 25 minutes.

The degree of protection was calculated by the following Equation (I):

$$\text{Degree of Protection} = \frac{H_o - H_{cb}}{H_o} * 100\%, \quad (I)$$

where $H_o$ is the heat of reaction of microcapsules without carbon black, and $H_{cb}$ is the heat of reaction of microcapsules with carbon black.

Figure 10:
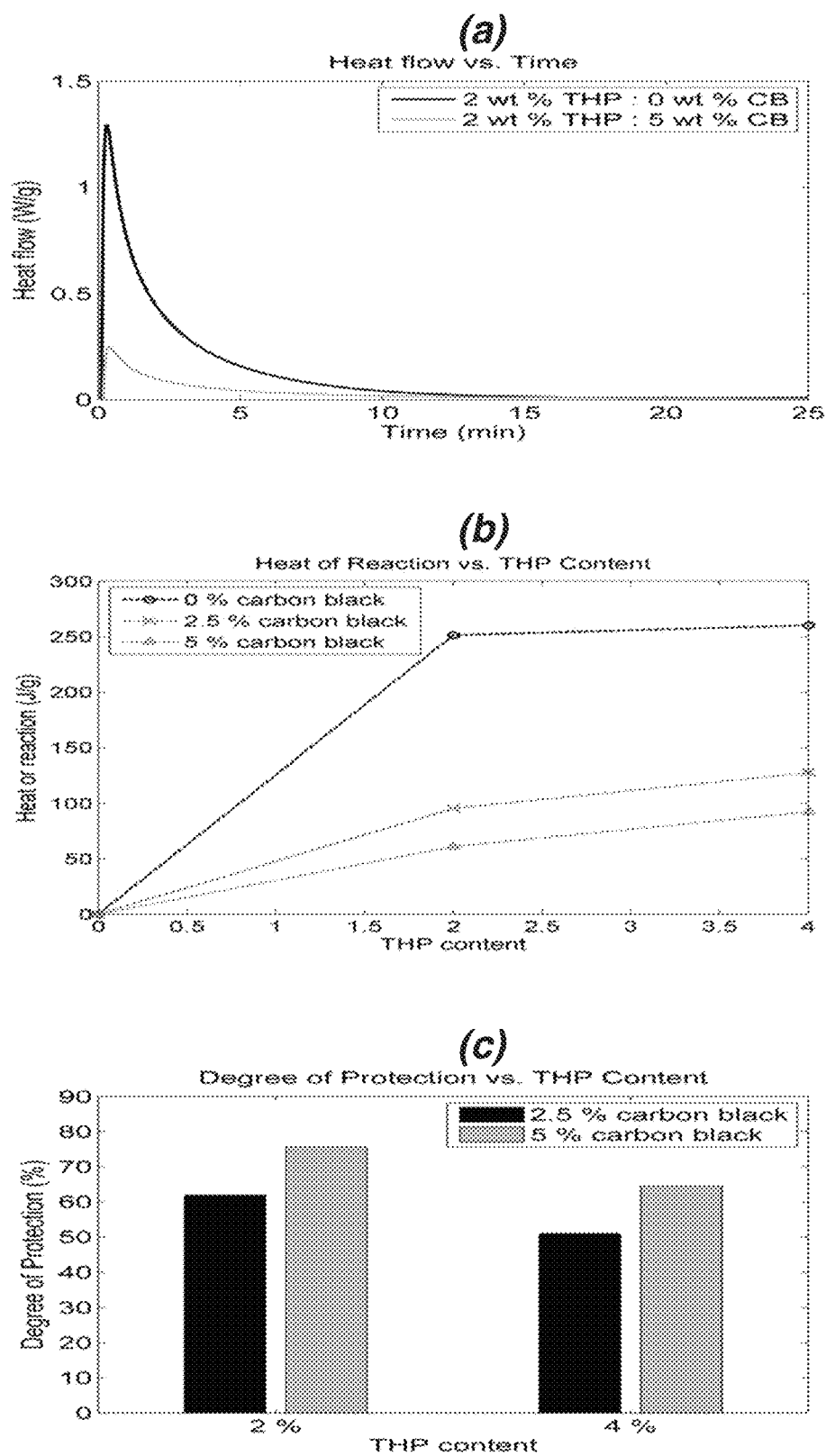
FIG. 10 shows photo-differential scanning calorimetry (p-DSC) graphs of capsules containing various amounts of carbon black pigment and UV catalyst (THP).

A p-DSC of two representative exothermic reactions measuring heat flow versus time is shown in (a) of FIG. 10. Two typical exothermic plots are shown in this figure. One trace shows the exothermic reaction of microcapsules without carbon black (0 wt % CB) and the other trace is of microcapsules with carbon black (5 wt % CB). A content of 2 wt % THP was utilized in these experiments. Integrating the area under these peaks gives the heat of reaction.

A p-DSC of the heat of reaction versus UV catalyst (THP) content for capsules of differing carbon black content (0, 2.5 and 5 wt % CB) is shown in (b) of FIG. 10. This figure shows the heat of reaction for microcapsules with various amounts of the UV catalyst (THP) and carbon black. Utilizing Equation (I), the degree of protection was calculated for capsules having different amounts of carbon black content (2.5 and 5 wt % CB) and UV catalyst content (2 and 4 wt % THP) and is shown in (c) of FIG. 10. The microcapsules with carbon black were determined to have a degree of protection of up to about 75% when compared to capsules without carbon black. This means that 75% of the active capsule core is still active after being exposed to UV light. While these examples achieved only about 75% degree of protection, it is understood that higher degrees of protection up to and including 100% protection may be achieved via routine optimization of the formulating and processing conditions. In certain embodiments, the degree of protection can be up to about 75%, about 80%, about 85%, about 90%, about 95% or about 100%. This figure shows that raising the level of carbon black content in the capsules from 2.5% to 5.0% increased the degree of protection by about 20-30%. However, raising the level of THP content in the capsules form 2% to 4% decreased the degree of protection by about 5-10%.

Example 4. Anti-Corrosive Performance of Self-Healed Coatings (i) Substrate and Coating Preparation A substrate was prepared by sandblasting a hot rolled carbon steel sheet (METALS DEPOT) to "white" steel. The substrate was cleaned with compressed air, rinsed in acetone, and air-dried. Two types of coatings (A and B) were prepared and tested.

Coating A

INTEGARD™ 251 (INTERNATIONAL/AKZO NOBEL) is a two-component epoxy anti-corrosive primer coating pigmented with zinc phosphate having a ratio of resin to curing agent of about 10:2.5. About 10 wt % of microcapsules (with respect to the total weight of the coating) were added to the epoxy coating. The core composition of the microcapsules comprised about 98 wt % of epoxy resin (EPON™ 813) and about 2 wt % UV catalyst (THP). The microcapsules were embedded (dispersed) in the epoxy coating and applied to a prepared steel substrate with a conventional doctor blade. As a control, microcapsules containing about 100 wt % of hexyl acetate solvent in their core were also prepared. Ultrasonic thickness measurements revealed an average coating thickness of 74.6 μm±7.2 μm.

Coating B

About 10 wt % of microcapsules (with respect to the total weight of the coating) containing within their cores about 98 wt % of epoxy resin (EPON™ 813, HEXION) and about 2 wt % UV catalyst (THP) were embedded (dispersed) in a 10:4 ratio mixture of EPI-REZ™ 6520-WH-53 resin (HEXION) and EPIKURE™ 6870-W-53 curing agent (HEXION). A clean steel substrate was prepared as described above. The coating was applied to the prepared steel substrate by one of two conventional methods—a doctor blade or a conveyorized spray coating system. As a control, microcapsules containing about 100 wt % of epoxy resin in their core without a curing agent (e.g., UV catalyst) were also prepared. Ultrasonic thickness measurements revealed an average coating thickness of 86±12 μm.

(ii) Damage and Healing Protocol

Figure 11:
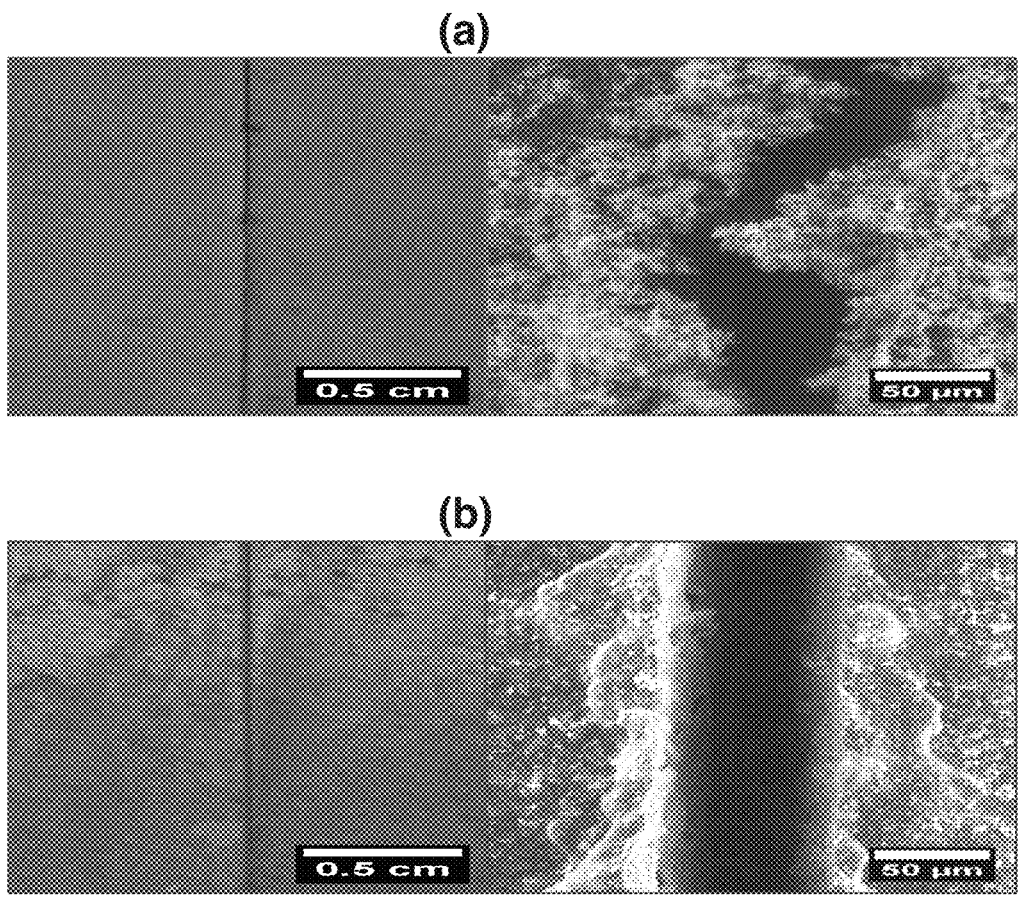
FIG. 11 shows images of control and healed coatings A that have been scratched and immersed in a NaCl solution.

Several razor blade scratches of different sizes were made on the coatings with a corrocutter having an adjustable cantilevered weight. After scratching the coatings of Coating A and its control, the coatings were exposed to long wave UV light for about 3 h at 3800 μW/cm$^2$ to initiate the self-healing process. The scratched coatings were then submersed in about a 5 wt % NaCl solution for about 3 days to accelerate corrosion and test the anticorrosive properties of the control vs. healed coatings. FIG. 11 shows images of control and healed coatings of Coating A. Optical and SEM images of the control coating are shown in (a) of the figure, while optical and SEM images of the healed Coating A are shown in (b) of the figure. Corrosion was visibly present in the control coating shown in (a) of the figure, whereas the healed Coating A exhibited little to no presence of corrosion as shown in (b) of the figure.

Figure 12:
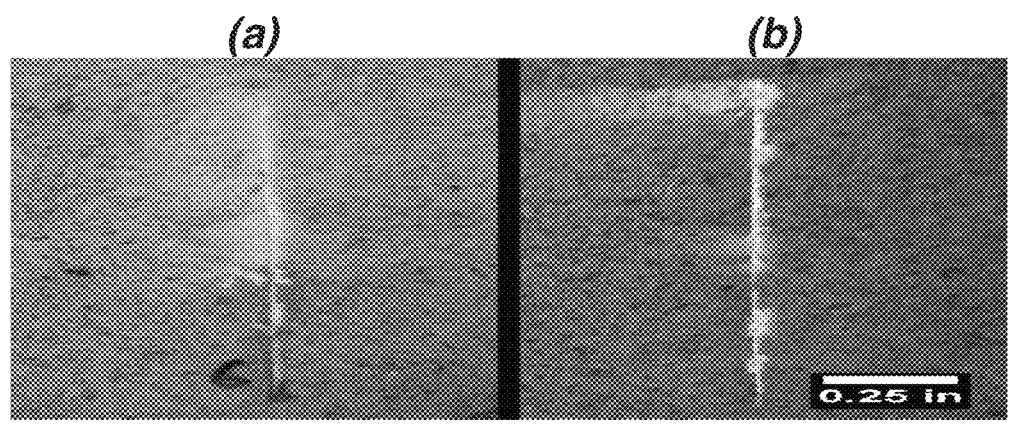
FIG. 12 shows images of control and healed coatings B that have been scratched and immersed in a NaCl solution.

Similarly, for experiments run on Coating B, the coatings were exposed to UV light for about 20 h after uniform damage was inflicted on the coatings. The coatings were then submerged in about a 5 wt % NaCl solution for about 5 days to introduce and test corrosion damage to the system. Images of the (a) control coating and (b) healed Coating B are shown in FIG. 12. Corrosion was visibly present in the control coating, whereas the healed Coating B showed little to no presence of corrosion.

(iii) Anti-Corrosion Performance

The healed coatings provided corrosive protection. The corrosive protection was confirmed by electrochemical analysis using a conventional linear polarization device (Model VSP, BioLogic). The corrosion current ($I_{corr}$) is the current value associated with steady state corrosion and was determined by Tafel extrapolation. The inhibition efficiency was calculated by Equation (II):

$$IE\% = \frac{I_o - I_i}{I_o} * 100\%, \quad (II)$$

where $I_o$ is the uninhibited control corrosion current and $I_i$ is the inhibited healed corrosion current.

Figure 13:
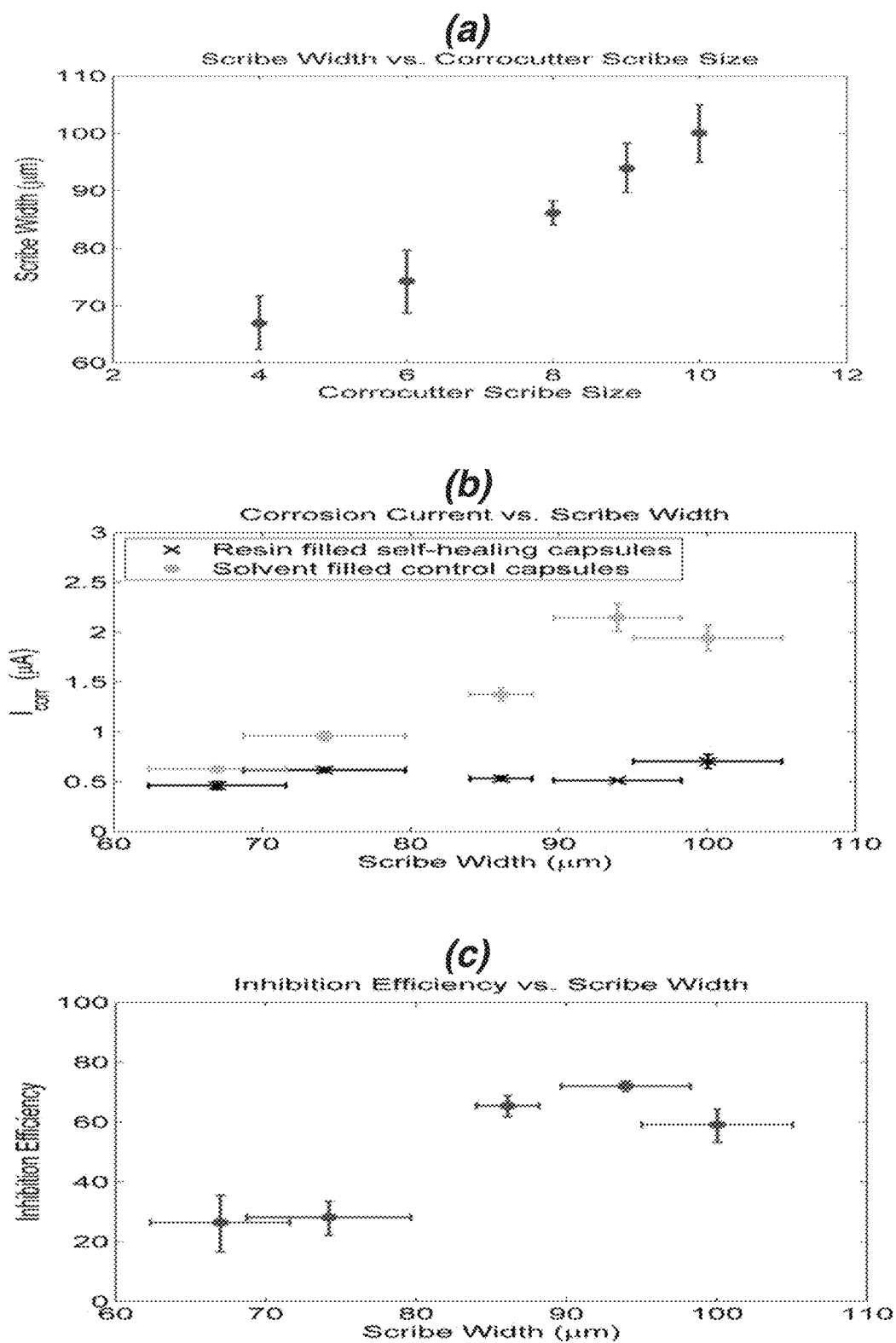
FIG. 13 shows graphs of scribe width vs. corrocutter scribe size, corrosion current vs. scribe width and inhibition efficiency vs. scribe width.

The corrocutter increased damage size by increasing a cantilevered weight on a scribe tool or razor blade. We tested the effect of damage size for Coating A in FIG. 13. In (a) of FIG. 13, the relationship between the corrocutter scribe size and the scribe width in Coating A is shown. In (b) of FIG. 13, the relationship between the scribe width and the corrosion current in Coating A is shown. The corrosion current for the resin filled self-healing capsule system remained relatively constant while the corrosion current of the solvent filled control system increased with damage size. An increasing corrosion current means that there is more corrosion in the control system with larger damage sizes. In (c) of FIG. 13, the relationship between the scribe width and the inhibition efficiency in Coating A is shown. A maximum inhibition efficiency near 75% was observed. This means that there was 75% less corrosion in the self-healing system when compared to the control counterpart.

Figure 14:
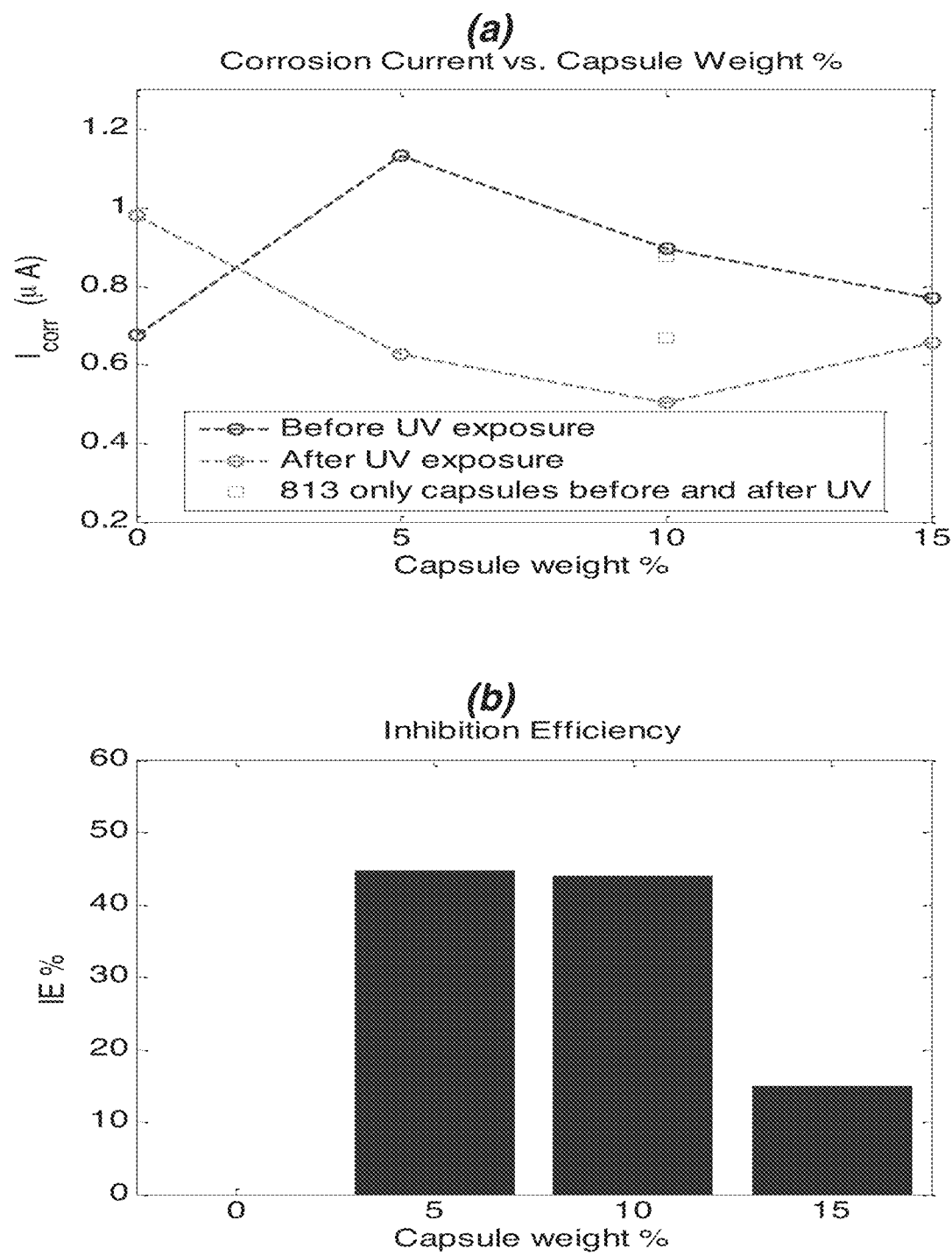
FIG. 14 shows graphs of corrosion current vs. capsule weight % of control and healed coatings B before and after UV exposure, and the inhibition efficiency of healed coatings B as a function of capsule weight %.

We tested the effect of three capsule weights for Coating B in FIG. 14. Two formulations of Coating B (10 wt %) were modified to have 5 wt % and 15 wt % of microcapsules, respectively. FIG. 14 shows (a) the corrosion current vs. capsule wt % of the control and healed coatings for the three capsule weights of Coating B, and (b) the inhibition efficiency of the healed Coating B as a function of capsule wt %. The corrosion current was measured before and after UV exposure. The electrochemical analysis showed that up about to 45% corrosion inhibition efficiency occurred when UV curable microcapsules were added to the coating.

Unexpected variations in the corrosion current and inhibition efficiency were observed for the 5, 10 and 15 wt % Coating B microcapsules. Upon further analysis of the coating thicknesses, all three coatings tended not to be as uniform as would have been expected. Accordingly, these results are preliminary and do not show the maximum healing capabilities of the coating system. A false sense in healing and higher inhibition efficiency can be observed if the coatings are thicker than expected. Similarly, less healing and lower inhibition efficiency can be observed if the coatings are thinner than expected.

What is claimed is:

1. An autonomic self-healing material comprising
   a plurality of microcapsules having a first outer shell;
   a photopolymer composition encapsulated within he first shell of the microcapsules; and
   a Pickering emulsion of photo-protecting solid particles lining the inside wall of the first outer shell, wherein the first outer shell and Pickering emulsion of photo-protecting solid particles form a photo-protecting outer shell that absorbs or reflects electromagnetic radiation to effectively prevent curing of the encapsulated photopolymer composition;
   where the self-healing process is autonomically initiated when a region of the material is sufficiently damaged to induce rupturing of one or more microcapsules, which release the photopolymer composition in and/or around the damaged region, and the released photopolymer composition is exposed to electromagnetic radiation.

2. The material of claim 1 where the material is formulated into a film coated onto a substrate.

3. The material of claim 2 where the substrate comprises a metal, non-metal, ceramic or polymer.

4. The material of claim 3 where the substrate comprises steel.

5. The material of claim 2 where the electromagnetic radiation comprises UV radiation, and the degree of protection from UV radiation provided by the photo-protecting outer shell is about 65% to 100%.

6. The material of claim 5 where the photopolymer composition comprises an epoxy, polyurethane, urethane, fluoropolymer, polyvinyl chloride, polyimide, polyamide, acrylic, alkyd, silicone, phenolic resin, nitrocellulose, nylon, natural rubber, synthetic rubber, or a combination thereof.

7. The material of claim 6 where the photopolymer composition comprises a photo-curable epoxy resin.

8. The material of claim 7 where the photo-curable epoxy resin composition comprises bisphenol A epoxy resin, bisphenol F epoxy resin, novolac epoxy resin, aliphatic epoxy resin, cycloaliphatic epoxy resin, glycidylamine epoxy resin, or a combination thereof.

9. The material of claim 5 where the photopolymer composition comprises a UV polymerization catalyst.

10. The material of claim 9 where the UV polymerization catalyst comprises Iodonium (4-methylphenyl)[4-(2-methylpropyl)phenyl]-hexafluorophosphate, THP (triarylsulfonium hexafluorophosphate salts), THA (triarylsulfonium hexafluoroantimonate salts), or 2 hydroxy-2-methyl-1-phenylpropan-1-one.

11. The material of claim 2 where the photo-protecting solid particles comprise carbon black, nano clay, zinc, zinc oxide, titanium dioxide, or a combination thereof.

12. The material of claim 11 where the photo-protecting solid particles comprise carbon black pigment, wherein the wt. % of carbon black pigment is about 0.2-10%.

13. The material of claim 2 where the photo-protecting outer shell comprises poly(urea-formaldehyde) (UF) and a plurality of photo-protecting solid particles.

14. The material of claim 2 where the film comprises an epoxy resin.

15. The material of claim 14 where the epoxy resin comprises a zinc pigmented epoxy, water-based epoxy or bisphenol A diglycidyl ether (DGEBA) based resin.

16. The material of claim 2 where the microcapsules further comprise one or more other functional agents.

17. The material of claim 2 where the photopolymer composition comprises about 95-99.9 wt % of a polymer resin and about 0.1-5 wt % of a polymerization catalyst, and the photo-protecting outer shell comprises about 0.2-10 wt % of a pigment, each wt % being relative to the total weight of each microcapsule prior to being formulated into the film.

18. An autonomic self-healing material comprising one or more film-forming binders and a plurality of microcapsules, the microcapsules enclosing at least a photopolymer composition encapsulated within a volume defined by a photo-protecting outer shell that absorbs or reflects electromagnetic radiation to effectively prevent curing of the enclosed photopolymer composition,
  wherein the photo-protecting outer shell comprises a first outer shell and a Pickering emulsion of photo-protecting solid particles lining the inside wall of the first outer shell; and
  where the self-healing process is autonomically initiated when a region of the material is sufficiently damaged to induce rupturing of one or more microcapsules, which release the photopolymer composition in and/or around the damaged region, and the released photopolymer composition is exposed to electromagnetic radiation.

19. The material of claim 18 where
  (i) the microcapsules are dispersed in an epoxy resin film; and
  (ii) the photo-protecting outer shell comprises poly(urea-formaldehyde) (UF) and a plurality of photo-protecting solid particles.

20. A method of autonomically self-healing a material after it has been damaged and exposed to electromagnetic radiation comprising formulating a plurality of microcapsules into the material, wherein the microcapsules comprise a photopolymer composition enclosed within a photo-protecting outer shell that absorbs or reflects electromagnetic radiation to effectively prevent curing of the enclosed photopolymer composition,
  wherein the photo-protecting outer shell comprises a first outer shell and a Pickering emulsion of photo-protecting solid particles lining the inside wall of the first outer shell; and
  where the self-healing process is autonomically initiated when a region of the material is sufficiently damaged to induce rupturing of one or more of the microcapsules, which release the photopolymer composition in and/or around the damaged region, and the released photopolymer composition is exposed to electromagnetic radiation.

* * * * *